(12) United States Patent
Hara

(10) Patent No.: US 8,760,727 B2
(45) Date of Patent: Jun. 24, 2014

(54) SHEET-CONVEYING DEVICE HAVING OPENING

(75) Inventor: Masayuki Hara, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 115 days.

(21) Appl. No.: 13/471,595

(22) Filed: May 15, 2012

(65) Prior Publication Data

US 2013/0083367 A1 Apr. 4, 2013

(30) Foreign Application Priority Data

Sep. 30, 2011 (JP) ................................ 2011-216314

(51) Int. Cl.
*H04N 1/40* (2006.01)

(52) U.S. Cl.
USPC ........................................................ 358/449

(58) Field of Classification Search
None
See application file for complete search history.

(56) References Cited

U.S. PATENT DOCUMENTS

| 6,353,726 B1* | 3/2002 | Murata et al. ................. 399/407 |
| 2004/0141021 A1* | 7/2004 | Yamamoto et al. ............. 347/16 |
| 2010/0066782 A1* | 3/2010 | Yamamoto et al. ............. 347/16 |
| 2011/0063696 A1* | 3/2011 | Taki et al. ..................... 358/498 |

FOREIGN PATENT DOCUMENTS

| JP | 05-188685 | 7/1993 |
| JP | 11-127301 | 5/1999 |
| JP | 2007-049300 | 2/2007 |

* cited by examiner

*Primary Examiner* — Mark Zimmerman
*Assistant Examiner* — Michael Burleson
(74) *Attorney, Agent, or Firm* — Banner & Witcoff, Ltd.

(57) ABSTRACT

A sheet conveying apparatus includes: a sheet placing part; a conveying part; an apparatus wall; and a judging unit. The sheet placing part is configured to receive a sheet placed thereon. The conveying part is configured to convey the sheet from the sheet placing part. The apparatus wall defines a first conveyance opening. The judging unit is configured to judge whether the sheet is able to pass the first conveyance opening. The conveying part conveys the sheet to the first conveyance opening if the judging unit determines that the sheet is able to pass through the first conveyance opening. The conveying part does not convey the sheet to the first conveyance opening if the judging unit determines that the sheet is unable to pass through the first conveyance opening.

12 Claims, 10 Drawing Sheets

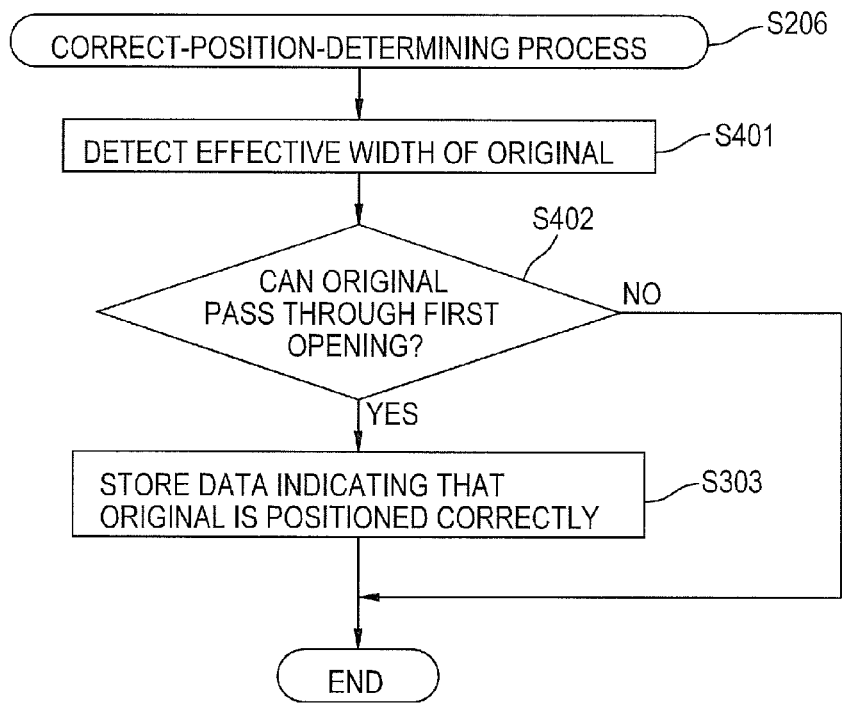
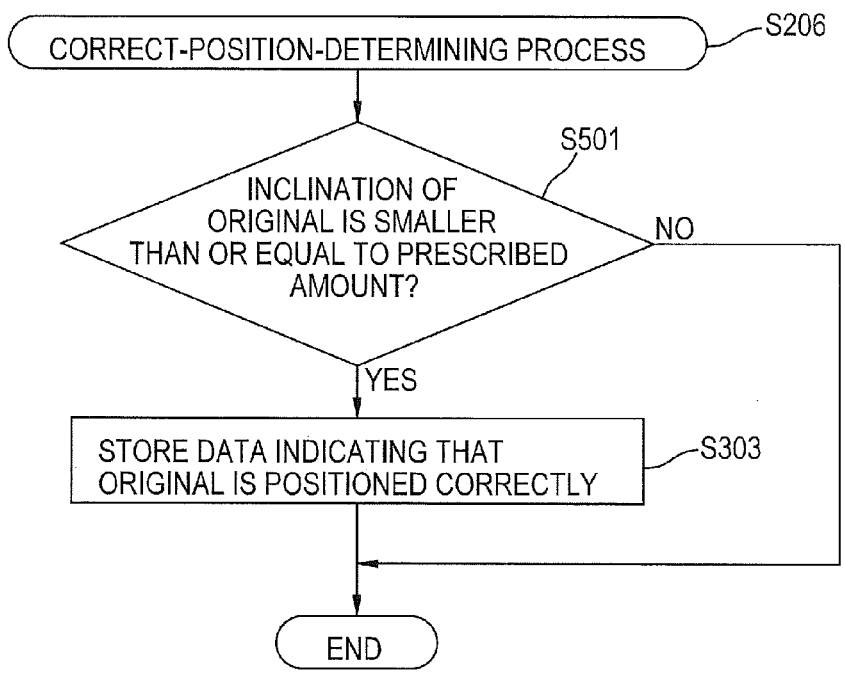

SHEET-CONVEYING DEVICE HAVING OPENING

CROSS REFERENCE TO RELATED APPLICATION

This application claims priority from Japanese Patent Application No. 2011-216314 filed Sep. 30, 2011. The entire content of this priority application is incorporated herein by reference.

TECHNICAL FIELD

The present invention relates to a sheet-conveying device for conveying sheets toward an opening.

BACKGROUND

There are known in the art reading devices that convey an original placed in an original tray, read the conveyed original with a reading unit, and convey the original to an opening after the original has been read.

SUMMARY

However, when the width of the original in the direction orthogonal to the direction that the original is conveyed is wider than the width of the opening, the original cannot pass through the opening. Consequently, the conventional reading devices have suffered from the problem of originals too wide for the opening being unable to pass therethrough and becoming jammed in the reading device. This problem is not limited to reading devices, but also applies to printing devices.

Therefore, it is an object of the present invention to provide a sheet-conveying device capable of preventing paper jams when conveying a sheet toward an opening.

In order to attain the above and other objects, the invention provides a sheet conveying apparatus, including: a sheet placing part; a conveying part; an apparatus wall; and a judging unit. The sheet placing part is configured to receive a sheet placed thereon. The conveying part is configured to convey the sheet from the sheet placing part. The apparatus wall defines a first conveyance opening. The judging unit is configured to judge whether the sheet is able to pass the first conveyance opening. The conveying part conveys the sheet to the first conveyance opening if the judging unit determines that the sheet is able to pass through the first conveyance opening. The conveying part does not convey the sheet to the first conveyance opening if the judging unit determines that the sheet is unable to pass through the first conveyance opening.

BRIEF DESCRIPTION OF THE DRAWINGS

The particular features and advantages of the invention as well as other objects will become apparent from the following description taken in connection with the accompanying drawings, in which:

FIG. 10 is a flowchart illustrating steps in a correct-position-determining process according to a first modification; and FIG. 11 is a flowchart illustrating steps in a correct-position-determining process according to a second modification.

DETAILED DESCRIPTION

First Embodiment

A multifunction peripheral (MFP) 1 according to a first embodiment of the present invention will be described with reference to FIGS. 1-9.

Figure 2:
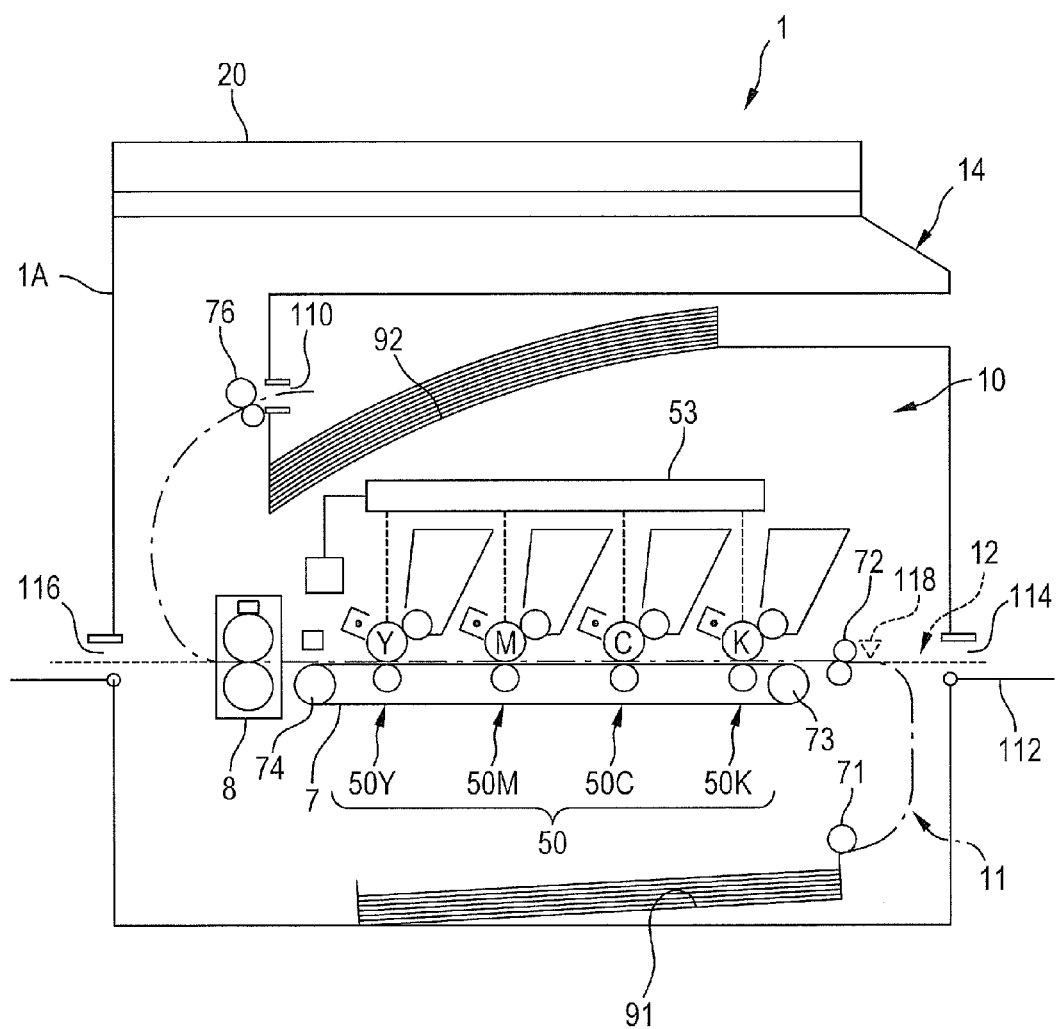
FIG. 2 shows an internal structure of an image-forming unit in the multifunction peripheral.
Figure 2:
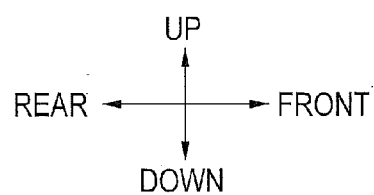

The terms "upward", "downward", "upper", "lower", "above", "below", "beneath", "right", "left", "front", "rear" and the like will be used throughout the description assuming that the multifunction peripheral 1 is disposed in an orientation in which it is intended to be used. In use, the multifunction peripheral 1 is disposed as shown in FIG. 2.

The multifunction peripheral 1 is for performing a scan function, print function, facsimile communication function, and various other functions. As shown in FIG. 2, the multifunction peripheral 1 includes: an image-forming unit 10 for forming images on recording paper; and an image-reading unit 20 for reading images from original 30 (see FIG. 4).

Electrical Structure of the Multifunction Peripheral

Next, the electrical structure of the multifunction peripheral (MFP) 1 will be described with reference to FIG. 1.

Figure 1:
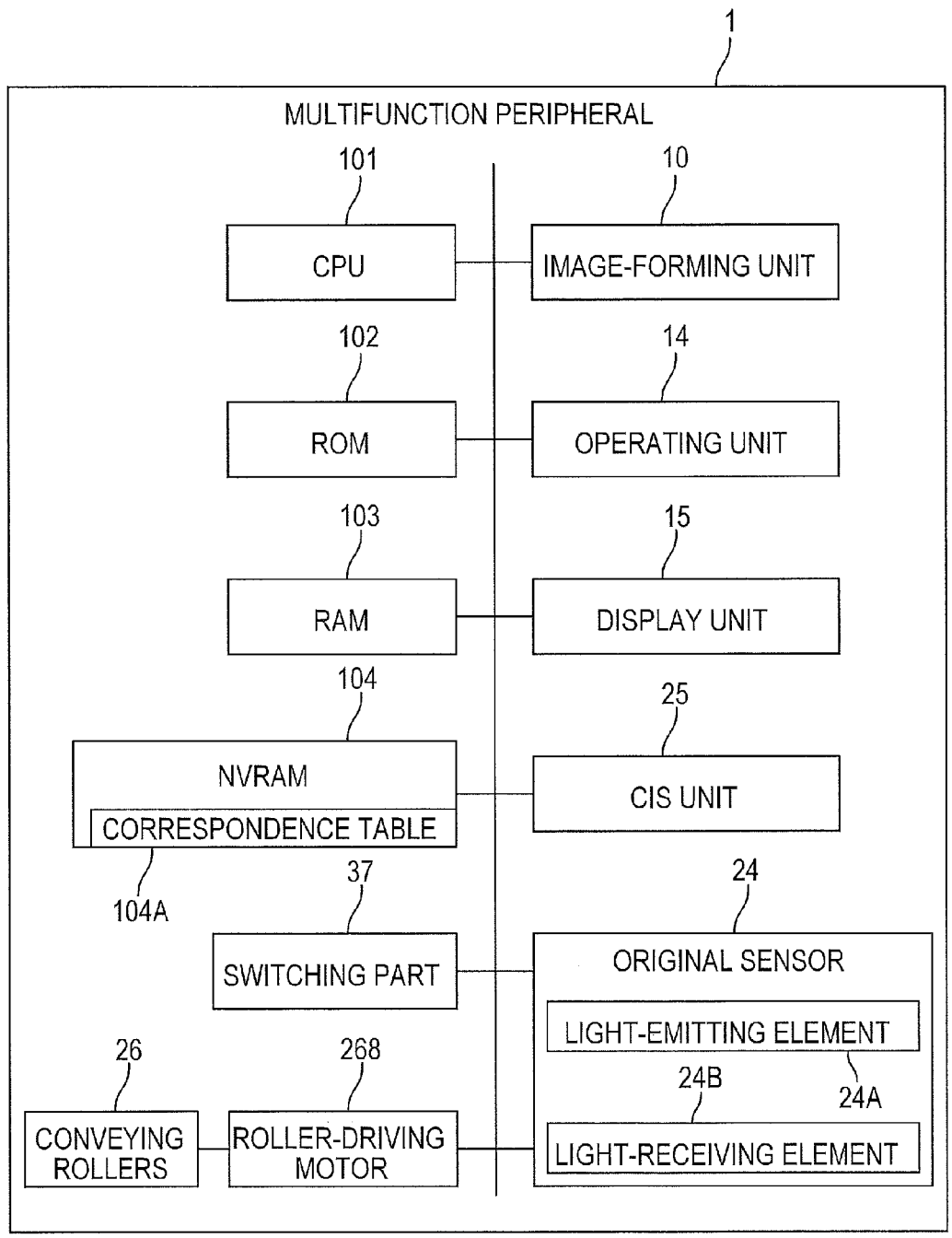
FIG. 1 is a block diagram showing the electrical structure of a multifunction peripheral according to a first embodiment of the present invention.

As shown in FIG. 1, in the MFP 1, a CPU 101 is connected to: a ROM 102; a RAM 103; a nonvolatile RAM (NVRAM) 104; the image-forming unit 10; an operating unit 14; a display unit 15; an original sensor 24; a roller-driving motor 268; a switching part 37; and a compact image sensor (CIS) unit 25. The operating unit 14 is configured of a set of buttons including a Start key, Stop key, numerical keypad, and the like. The display unit 15 is configured of a liquid crystal display (LCD). The roller-driving motor 268 is connected to a group of conveying rollers 26. The roller-driving motor 268 is for driving the conveying rollers 26. The original sensor 24, compact image sensor (CIS) unit 25, switching part 37, roller-driving motor 268, and conveying rollers 26 are provided in the image-reading unit 20.

The CPU 101 performs central control in all control processes performed on the MFP 1 by executing computations to implement a scan function, print function, facsimile communication function, and various other functions on the MFP 1. The ROM 102 stores: various control programs including a program of a conveyance control process to be described later with reference to FIGS. 7-9, settings, initial values, and the like required for controlling the MFP 1.

The RAM 103 serves as a work area into which the various control programs are read, or a storage area for temporarily storing image data and the like. The NVRAM 104 is a nonvolatile memory serving to store settings and images. The NVRAM 104 previously stores therein a correspondence table 104A. As shown below, the correspondence table 104A maps short and long dimensions of a plurality of predetermined sizes including various standard sizes, such as A4, A5, A6, A7, and A8, and a business card size. In other words, the correspondence table 104A stores, for each of the predetermined sizes, short and long dimensions in correspondence with each other.

CORRESPONDENCE TABLE 104A

| SIZE | LONG DIMENSION (mm) | SHORT DIMENSION (mm) |
| --- | --- | --- |
| A4 | 297 | 210 |
| A5 | 210 | 148 |
| A6 | 148 | 105 |
| A7 | 105 | 74 |
| BUSINESS CARD | 91 | 55 |
| A8 | 74 | 52 |

Structure of the Image-Forming Unit

Next, the image-forming unit 10 for forming images on recording paper will be described with reference to FIG. 2.

As shown in FIG. 2, the image-forming unit 10 includes process units 50 for forming colorant images and transferring the colorant images onto recording paper, a fixing unit 8 for fixing the colorant onto the recording paper, a recording-paper tray 91 for accommodating sheets of recording paper that have not yet undergone image formation, and a recording-paper discharge tray 92 for receiving and supporting sheets of recording paper after the image-forming process.

A conveying path 11 indicated by a chain line in FIG. 2 is formed inside the image-forming unit 10. The recording-paper tray 91 is positioned in the bottom of the MFP 1 and functions to accommodate sheets of recording paper. The recording-paper discharge tray 92 is formed on the top of the image-forming unit 10. The conveying path 11 is generally S-shaped and serves to guide recording paper accommodated in the recording-paper tray 91 to the recording-paper discharge tray 92. Along the S-shaped conveying path 11 are provided a feeding roller 71 for picking up sheets of recording paper from the recording-paper tray 91 one sheet at a time, a pair of conveying rollers 72 for conveying the sheets of recording paper received from the feeding roller 71 toward the process units 50, and discharge rollers 76 for guiding sheets received from the fixing unit 8 onto the recording-paper discharge tray 92 through a second recording-sheet-discharge opening 110. The second recording-sheet-discharge opening 110 is formed through a casing wall 1A of the multifunction peripheral 1 at a position confronting the recording-paper discharge tray 92.

Another conveying path 12 indicated by a dashed line in FIG. 2 is also provided inside the image-forming unit 10. The conveying path 12 is generally linear and serves to guide a sheet of recording paper inserted through an opening 114 provided on the front side of the MFP 1 (the right side in FIG. 2) to a first recording-sheet-discharge opening 116 formed in the rear side of the MFP 1 (the left side in FIG. 2). The MFP 1 is further provided with a manual-paper-feed tray 112 that is provided on the front surface of the MFP 1 so as to extend from the opening 114. The user can directly set recording paper into the manual-paper-feed tray 112.

The process units 50 are capable of forming color images. The process units 50 correspond to the colors yellow (Y), magenta (M), cyan (C), and black (K) arranged parallel to each other and juxtaposed horizontally. Specifically, the process units 50 include a process unit 50Y for forming images in yellow, a process unit 50M for forming images in magenta, a process unit 50C for forming images in cyan, and a process unit 50K for forming images in black. The process unit 50K is located in the most upstream side among all the process units 50 in a recording-paper conveying direction, along which a conveying belt 7 (to be described later) conveys the recording sheets.

The image-forming unit 10 also includes an exposure unit 53 for irradiating light onto the process units 50, conveying-belt rollers 73 and 74 disposed along the conveying path 11 and spaced apart in the front-to-rear direction, and the conveying belt 7 provided around the conveying-belt rollers 73 and 74 for conveying recording paper to transfer positions of the process units 50. The process units 50 function to form color images according to an electrophotographic method known in the art.

The image-forming unit 10 picks up one sheet of recording paper accommodated in the recording-paper tray 91 at a time, conveys the sheet to the process units 50, and transfers color images formed on the process units 50 to the recording paper. Subsequently, the image-forming unit 10 conveys the recording paper with the transferred color images to the fixing unit 8 and fixes the color images to the recording paper with heat. Finally, the image-forming unit 10 discharges the recording paper onto the recording-paper discharge tray 92.

Structure of the Image-Reading Unit

Next, the image-reading unit 20 of the MFP 1 will be described with reference to FIGS. 3 to 6. The image-reading unit 20 functions to read images from an original 30. While methods of reading the original 30 known in the art include a flatbed scanning method (method in which the original is static when scanned) and an automatic document feeder (ADF) scanning method (method in which the original is moving when scanned), only the ADF scanning method will be described herein.

Figure 3:
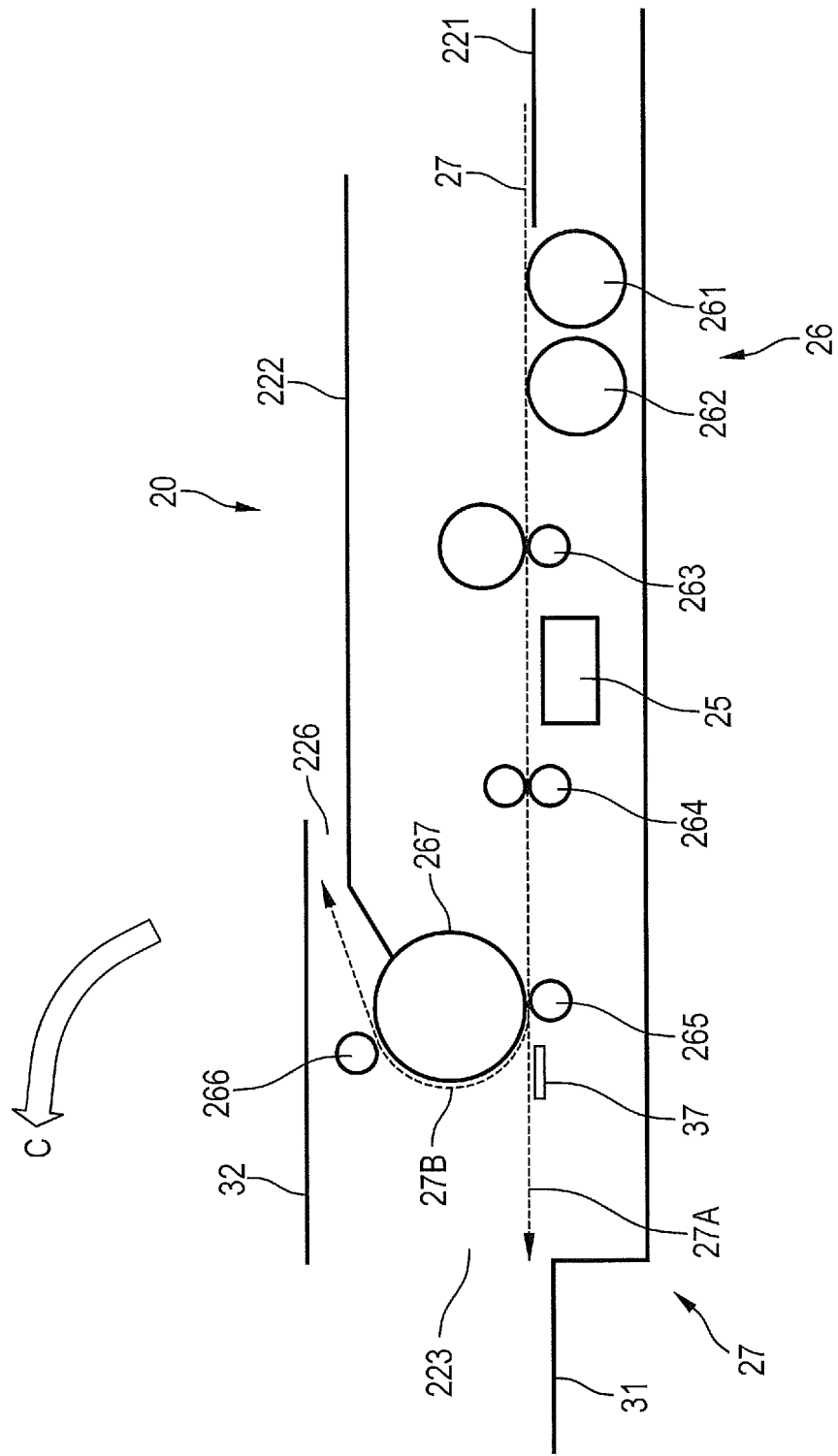
FIG. 3 shows an internal structure of an image-reading unit in the multifunction peripheral when a first opening is opened.
Figure 5:
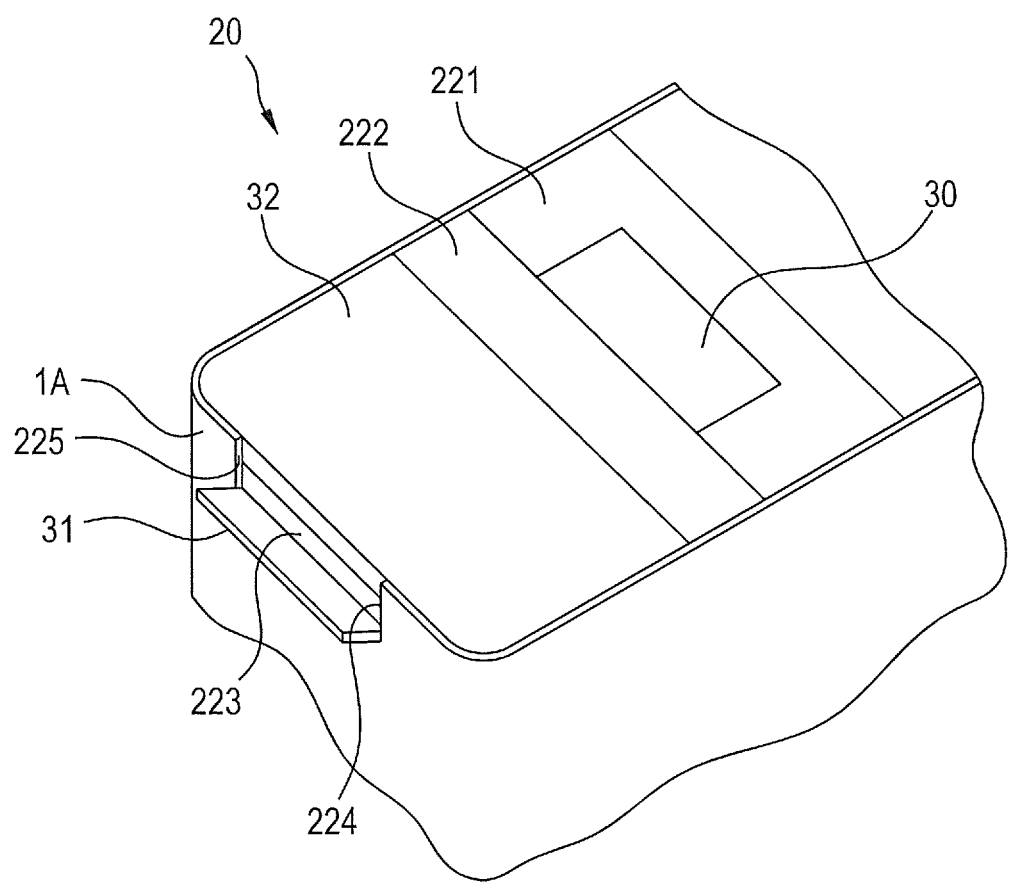
FIG. 5 is a perspective view of a part of the image-reading unit when a first cover is in its open state to open the first opening.

As shown in FIG. 3, the image-reading unit 20 includes an original tray 221 for loading unread sheets of the original 30, an original discharge tray 222 for receiving and supporting sheets of the original 30 after a reading operation, the CIS unit 25 for reading images from the original 30, a conveying path 27, a first cover 31 (see FIG. 5) for opening and closing a first original-discharge opening 223, and a second cover 32 (see FIG. 5).

Figure 4:
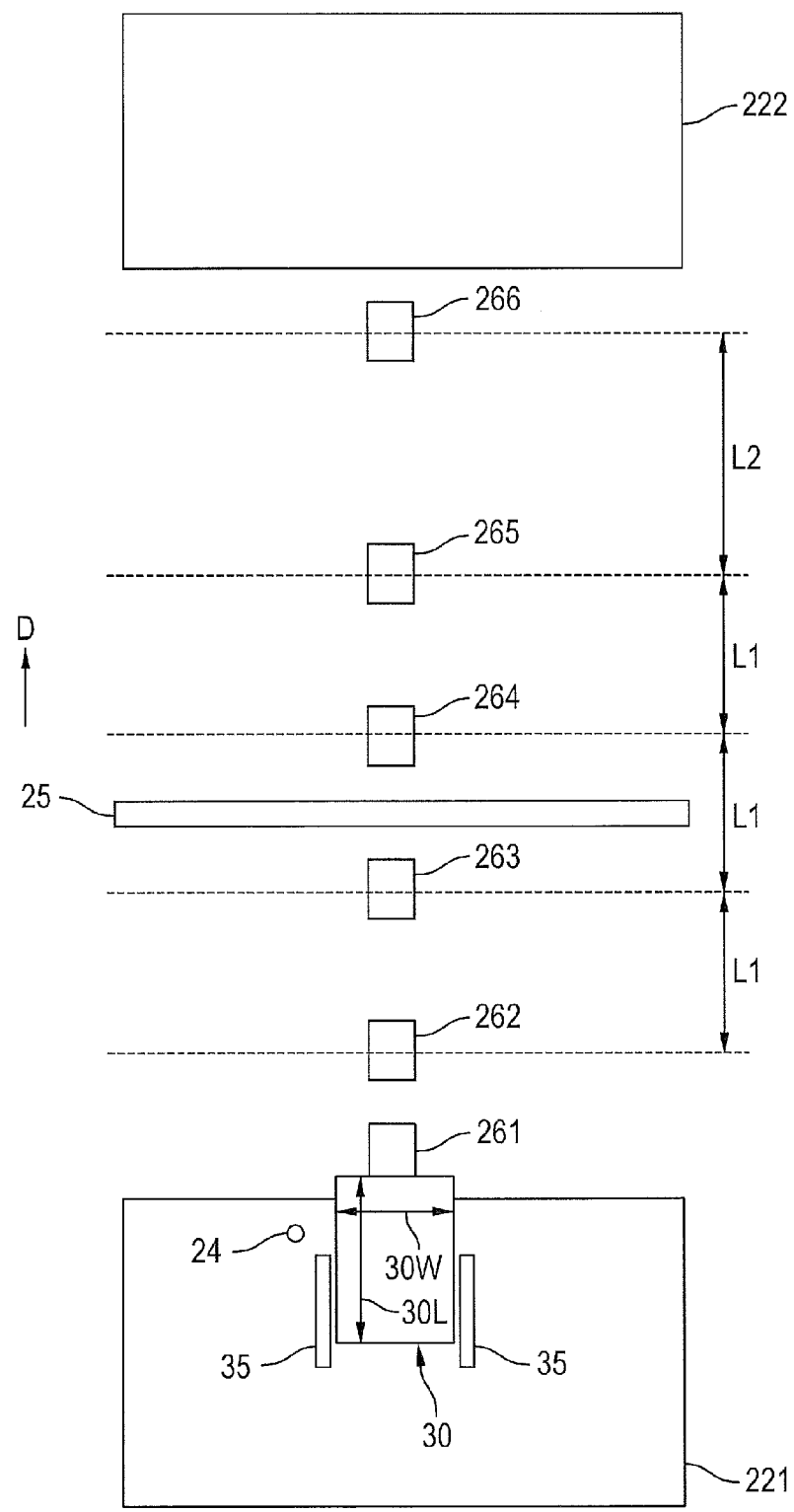
FIG. 4 is an explanatory diagram conceptually illustrating a conveying path to be linear from an original tray to a discharge tray in the image-reading unit.

As shown in FIG. 4, the original 30 is placed on the original tray 221 with its shorter edges being oriented orthogonal to the conveying direction of the conveying path 27. The conveying direction is indicated by an arrow D in FIG. 4. It is noted that a width of the original 30 (which will be referred to as "width 30W" hereinafter) is defined as a size of the original 30 in a direction orthogonal to the conveying direction D if the original 30 is correctly positioned with respect to the conveying direction D as illustrated in FIG. 4. So, in this example, the width 30W of the original 30 is equivalent to the short dimension of the original 30. It is further noted that a length of the original 30 (which will be referred to as "length 30L" hereinafter) is defined as a size of the original 30 in the conveying direction D if the original 30 is correctly positioned with respect to the conveying direction D as illustrated in FIG. 4. So, in this example, the length 30L of the original 30 is equivalent to the long dimension of the original 30.

The original tray 221 includes the original sensor 24 and a pair of original guides 35. The original sensor 24 is disposed on the upper side of the original tray 221, on which the original 30 is placed. The pair of original guides 35 is disposed on the upper side of the original tray 221 as being movable in a direction orthogonal to the conveying direction D. The original guides 35 are for regulating the position of the original 30 placed on the original tray 221 by aligning the widthwise center of the original 30 with the widthwise center of the conveying path 27. It is noted that the widthwise center of a reading range of the CIS unit 25 is positioned on the widthwise center of the conveying path 27.

The original sensor 24 is positioned so that an original 30 of at least A6 size will overlap the original sensor 24 when the original 30 is placed on the original tray 221 with the short edge being oriented orthogonal to the conveying direction D and the original guides 35 are used to adjust the set position of the original 30. The size of the original 30 can be generally determined based on the width 30W (short dimension, in this example) of the same. It is noted that an original 30 that can be placed in the original tray 221 can also be supported by the original discharge tray 222.

The original sensor 24 is a photosensor configured of a light-emitting element 24A and a light-receiving element 24B (see FIG. 1). The light-emitting element 24A and light-receiving element 24B are arranged so that when an original 30 of A6-size or large is placed on the original tray 221 as overlapping the original sensor 24, the light irradiated from the light-emitting element 24A reflects off the original 30 and falls incident on the light-receiving element 24B. When an original 30 with its width being smaller than that of an A6-size sheet is placed on the original tray 221, the light irradiated from the light-emitting element 24A does not reflect off the original 30 and therefore does not fall incident on the light-receiving element 24B because the original 30 does not overlap the original sensor 24. In this way, the original sensor 24 can detect whether or not the width of the original 30 is larger than or equal to that of an A6-size sheet.

The CIS unit 25 includes an LED light source, an optical element such as a rod lens array, and a group of light-receiving elements configured of contact image sensors (CIS) capable of receiving light. The light source irradiates light. The irradiated light reflects off the original 30. The reflected light is focused by the optical element. The focused reflected light is received by the group of light-receiving elements. In this way, the CIS unit 25 acquires analog data of the original 30. An A/D converter is used to convert the analog data to digital data in order to produce scan data.

As shown in FIG. 3, the conveying path 27 includes: a first conveying path 27A for guiding the original 30 to the first original-discharge opening 223; and a second conveying path 27B for guiding the original 30 to the original discharge tray 222 through a second original-discharge opening 226. The group of conveying rollers 26 (conveying rollers 261-267) are provided along the conveying path 27 for conveying the original 30.

As shown in FIG. 3, the switching part 37 is disposed downstream of the conveying roller 265 on the conveying path 27. The CPU 101 controls a solenoid or other drive source (not shown) to switch the switching part 37 between a position for opening the first conveying path 27A and a position for blocking the first conveying path 27A. The original 30 is conveyed along the first conveying path 27A to the first original-discharge opening 223 when the switching part 37 is positioned to open the first conveying path 27A, and is conveyed along the second conveying path 27B to the original discharge tray 222 via the second original-discharge opening 226 when the switching part 37 is positioned to block the first conveying path 27A.

FIG. 4 is an explanatory diagram conceptually illustrating the second conveying path 27B to be linear from the original tray 221 to the original discharge tray 222.

The original 30 is placed on the original tray 221 so that the shorter edges of the original 30 are oriented substantially orthogonal to the conveying direction. The original guides 35 are adjusted to position the original 30 in the center of the original tray 221. Depending on the size of the original 30, the original 30 may overlap or not overlap the original sensor 24.

In response to a read command, the image-reading unit 20 controls the roller-driving motor 268 (FIG. 1) to drive the conveying rollers 26 in a manner described below. The conveying roller 261 is first driven to pick up one sheet of original 30 set in the original tray 221 and to convey the sheet to the conveying roller 262. The conveying roller 262 is driven to convey the sheet to the conveying roller 263, and the CIS unit 25 reads the original 30 while the conveying roller 263 conveys the sheet to the conveying roller 264. After the CIS unit 25 has read the original 30, the conveying rollers 264, 265, and 266 are driven to convey the sheet to the original discharge tray 222.

On the conveying path 27, the conveying rollers 26 are arranged at intervals L1 from the conveying roller 262 to the conveying roller 265, while the conveying roller 266 is positioned at a longer interval L2 than the interval L1 from the conveying roller 265. The interval L2 is longer than the long dimension of a business card (91 mm), while the interval L1 is set shorter than the long dimension of a business card (91 mm). Since the original 30 shown in FIG. 4 has the size of a business card, a paper jam will occur between the conveying rollers 265 and 266 if the original 30 is conveyed along the second conveying path 27B.

Next, the first cover 31 will be described with reference to FIG. 5. FIG. 5 shows the image-reading unit 20 when the first cover 31 is in its open state, thereby opening the first original-discharge opening 223. When the first cover 31 is open, the original 30 conveyed to the first original-discharge opening 223 is outputted through the first original-discharge opening 223. Conversely, when closed, the first cover 31 blocks the first original-discharge opening 223.

The relationship between the original 30 and the first original-discharge opening 223 will be described next with reference to FIG. 6.

Figure 6:
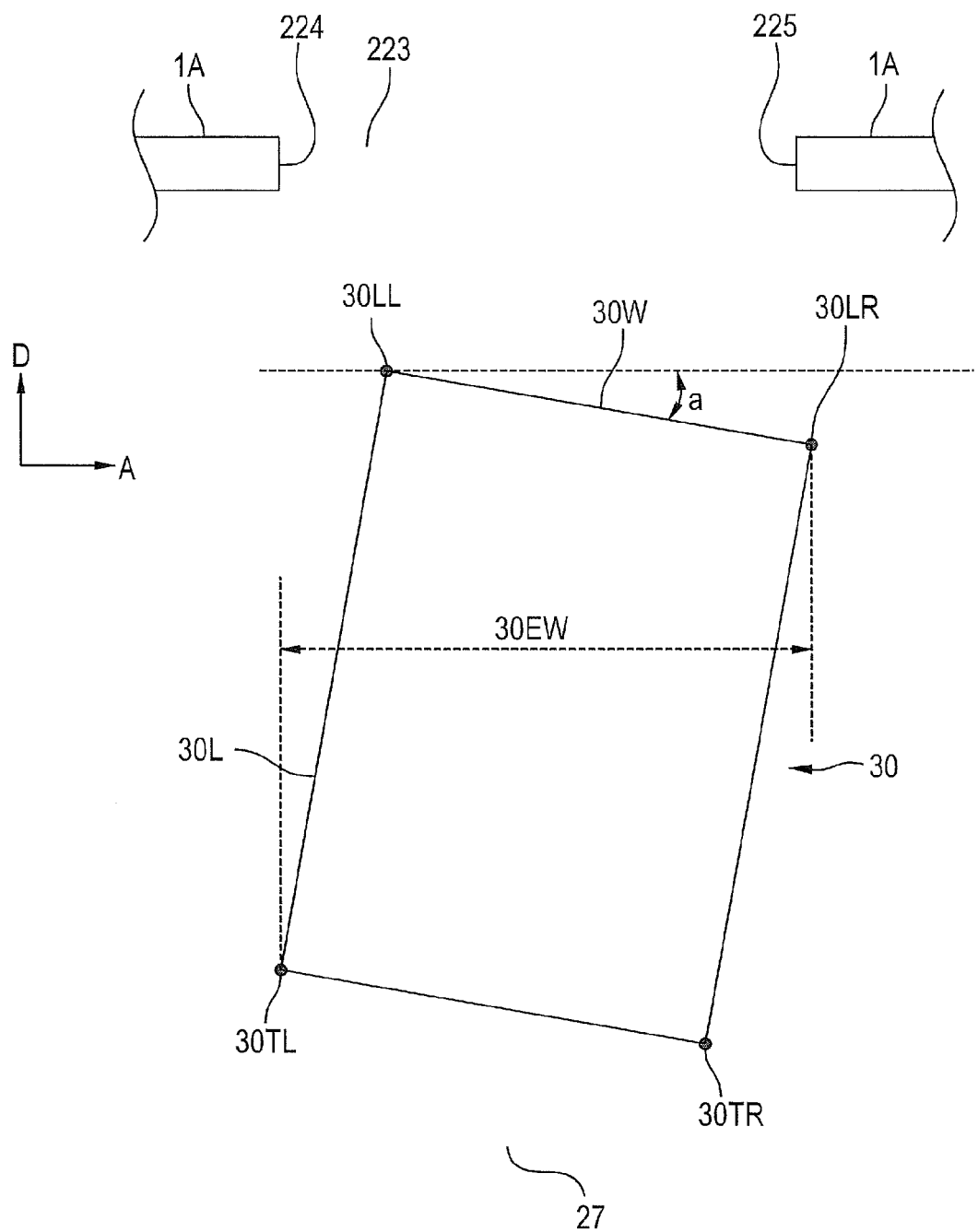
FIG. 6 is an explanatory diagram showing an original conveyed along the conveying path to the first opening.

FIG. 6 is an explanatory diagram showing an example of a state where the original 30 is being conveyed along the conveying path 27. In this example, the original 30 is an A6-size sheet and is conveyed so that the shorter edges of the original 30 are oriented substantially orthogonal to the conveying direction if the original 30 is positioned correctly with respect to the conveying direction. Also in FIG. 6, the conveying direction is indicated by an arrow D. In addition, a direction orthogonal to the conveying direction D (which will be referred to as "orthogonal-to-conveyance direction") is indicated by an arrow A. A main scanning direction of the CIS unit 25 extends in the orthogonal-to-conveyance direction A. In the example of FIG. 6, the original 30 is skewed so much that the original 30 cannot pass through the first original-discharge opening 223.

As shown in FIG. 5 and FIG. 6, the first original-discharge opening 223 is formed through the casing wall 1A of the MFP 1 as a gap defined between a left edge 224 facing the left side of the conveying path 27 and a right edge 225 facing the right side of the conveying path 27. The first original-discharge opening 223 is located in the center region of the first conveying path 27A in the orthogonal-to-conveyance direction, and has a size or width defined in the orthogonal-to-conveyance direction substantially equal to the A6-size short dimension, that is, 105 mm. It is noted that the short edges of the original 30 will be oriented orthogonal to the conveying direction D if the original 30 is positioned correctly with respect to the conveying direction D. Therefore, the original 30 cannot pass through the first original-discharge opening 223 if the width 30W (short dimension, in this example) of the original 30 is greater than the width of the first original-discharge opening 223. The original 30 cannot pass through the first original-discharge opening 223 when the original 30 is skewed more than a prescribed amount. The original 30 cannot pass through the first original-discharge opening 223 also when the original 30 collides with the left edge 224 or right edge 225.

As shown in FIG. 3, the second cover 32 is supported so as to be capable of rotating along the direction of the arrow C in FIG. 3 from the closed position to the open position. When the second cover 32 is in the open position, the user can reach into the image-reading unit 20 to access the first conveying path 27A. The user can remove a jammed or halted sheet of original 30 from the first conveying path 27A by opening the second cover 32. As shown in FIG. 3, the second original-discharge opening 226 is formed between the original discharge tray 222 and the second cover 32 so that sheets of the original that have been conveyed along the second conveying path 27B can be discharged onto the original discharge tray 222. The second original-discharge opening 226 has a size of width in the orthogonal-to-conveyance direction larger than that of the first original-discharge opening 223.

Conveyance Control Process

Next, a conveyance control process for the image-reading unit 20 will be described with reference to FIGS. 6 to 9.

The conveyance control process begins when the user inputs a read command on the operating unit 14.

Figure 7:
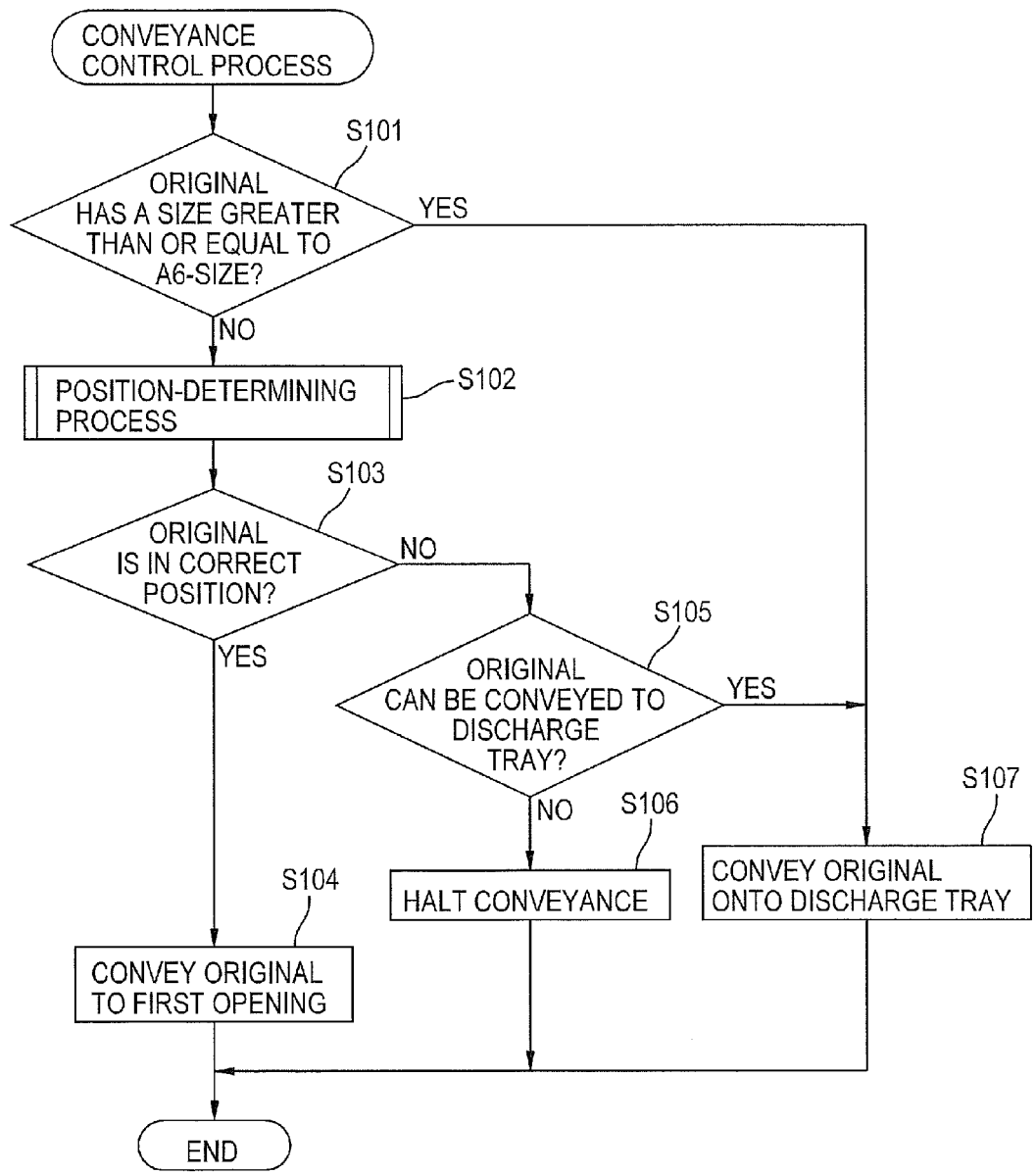
FIG. 7 is a flowchart illustrating steps in a conveyance control process according to the first embodiment.

In S101 of FIG. 7 the CPU 101 of the MFP 1 determines whether the width 30W of the original 30 set in the original tray 221 is greater than or equal to the A6-size short dimension, that is, 105 mm. The CPU 101 makes this determination based on detection results received from the original sensor 24. If the CPU 101 determines that the width 30W of the original 30 is greater than or equal to the A6-size short dimension (S101: YES), in S107 the CPU 101 controls the switching unit 37 to switch the conveying path 27 from the first conveying path 27A to the second conveying path 27B, and conveys the sheet of original 30 onto the original discharge tray 222 after the CIS unit 25 has read an image from the original 30 one line at a time. Subsequently, the CPU 101 ends the conveyance control process. The CPU 101 conveys the original 30 to the original discharge tray 222 in this case because an original 30 of A6-size or greater is likely to collide with the left edge 224 or right edge 225 defining the first original-discharge opening 223, particularly when the original 30 is conveyed with skew and because an original 30 larger than A6-size, such as an A4-size sheet, cannot pass through the first original-discharge opening 223.

However, if the CPU 101 determines that the width 30W of the original 30 is narrower than the A6-size short dimension (S101: NO), in S102 the CPU 101 executes a position-determining process described later. It is noted that in S102, the roller-driving motor 268 starts driving the conveying rollers 26 to start conveying the original 30 from the original tray 221. During the position-determining process, the CIS unit 25 reads the original 30 to obtain scan data from the original 30 as will be described later.

In S103 the CPU 101 determines whether the original 30 is in its correct position with respect to the conveying path 27 based on the results of the position-determining process in S102. In this example, the CPU 101 determines whether data has been stored in the RAM 103 indicating that the original 30 is in its correct position.

If the CPU 101 determines that the original 30 is positioned correctly (S103: YES), in S104 the CPU 101 continues to convey the original 30 to the first original-discharge opening 223 and subsequently ends the conveyance control process.

However, if the CPU 101 determines in S103 that the original 30 is positioned incorrectly (S103: NO), in S105 the CPU 101 determines whether the original 30 can be conveyed to the original discharge tray 222.

Because the conveying rollers 265 and 266 provided on the second conveying path 27B are spaced farther apart than the long dimension of a business card (91 mm), an original 30 of business card size or smaller cannot be conveyed along the second conveying path 27B. Hence, the CPU 101 judges in S105 whether the original 30 can be conveyed to the original discharge tray 222 by determining whether the original 30 is larger than a business card.

Specifically, the CPU 101 judges whether the width 30W of the original 30 is larger than the business card short dimension (55 mm). The CPU 101 determines that the original 30 can be conveyed to the original discharge tray 222 if the width 30W of the original 30 is larger than the business card short dimension. It is noted that in S105, the CPU 101 first determines the width 30W of the original 30 based on scan data that has been obtained during the position-determining process of S102.

Instead, in S105, the CPU 101 may judge whether the length 30L of the original 30 is larger than the business card long dimension (91 mm). The CPU 101 determines that the original 30 can be conveyed to the original discharge tray 222 if the length 30L of the original 30 is larger than the business card long dimension. In this case, the CPU 101 first determines the width 30W of the original 30 based on scan data that has been obtained during the position-determining process of S102. The CPU 101 then references the correspondence table 104A, and acquires a long dimension that is stored in the correspondence table 104A in correspondence with a short dimension that is equal to the width 30W of the original 30. The CPU 101 then sets the acquired size as the length 30L of the original 30.

Now assume that the width 30W of an original 30 is detected as equal to 52 mm based on scan data that has been obtained during the position-determining process of S102. In such a case, the CPU 101 reads 74 mm from the correspondence table 104A, sets 74 mm as the length 30L of the original 30, determines that the length 30L of the original 30 is not larger than the business card long dimension (91 mm), and determines that the original 30 cannot be conveyed to the original discharge tray 222.

If the CPU 101 determines that the original 30 can be conveyed to the original discharge tray 222 (S105: YES), then in S107 the CPU 101 conveys the original 30 to the original discharge tray 222 and subsequently ends the conveyance control process. An example of an original 30 that can be conveyed in this instance is a skewed A7-size sheet that cannot pass through the first original-discharge opening 223.

However, if the CPU 101 determines that the original 30 cannot be conveyed to the original discharge tray 222 (S105: NO), in S106 the CPU 101 halts conveyance of the original 30. One case in which this may occur is a skewed business card size original 30 that cannot pass through the first original-discharge opening 223 and also cannot be conveyed along the second conveying path 27B.

In this case, the CPU 101 displays a message on the display unit 15 indicating that conveyance of the original 30 was halted, and subsequently ends the conveyance control process. As a result, the user must open the second cover 32 to remove the original 30 from the conveying path 27.

Position-Determining Process

Next, the position-determining process of S102 will be described with reference to FIG. 8.

Figure 8:
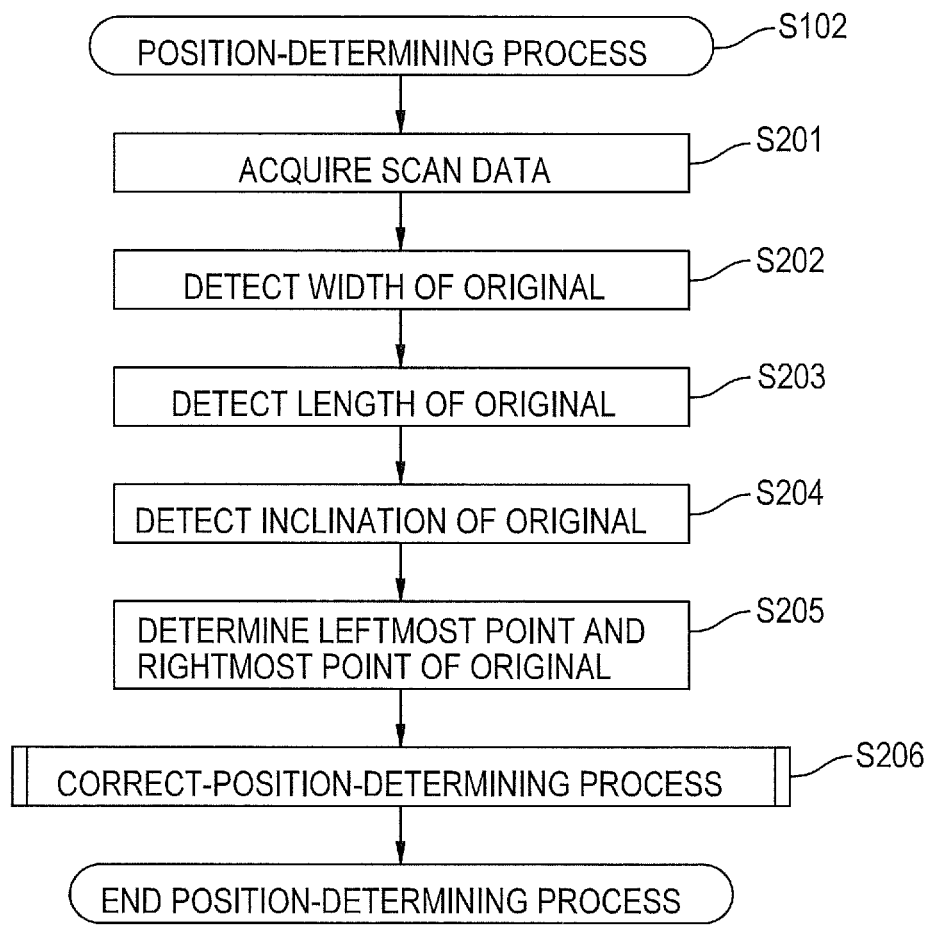
FIG. 8 is a flowchart illustrating steps in a position-determining process in the conveyance control process of FIG. 7.

Although not shown in FIG. 8, when starting the position-determining process of S102, the CPU 101 first begins conveying the original 30. Then, in S201, the CPU 101 controls the CIS unit 25 to begin reading the original 30 and begins acquiring scan data that is sequentially outputted from the CIS unit 25 as the CIS unit 25 continues the reading operation.

Note that the original 30 has not yet reached the first original-discharge opening 223 when the CIS unit 25 is reading the first few lines from the leading edge of the original 30. However, depending on the size of the original 30, the leading edge of the original 30 will possibly arrive at the first original-discharge opening 223 while the CIS unit 25 is still reading the original 30.

It is noted that an edge image indicating the contours of the original 30, as illustrated by the original 30 in FIG. 6, can be obtained from the scan data that the CIS unit 25 generates by reading the original 30.

As shown in FIG. 6, the original 30 is of a rectangular shape, and includes four corners: a leading left corner 30LL, a leading right corner 30LR, a trailing right corner 30TR, and a trailing left corner 30TL with respect to the conveying direction D. A leading edge of the original 30 is defined as an edge extending between the leading left corner 30LL and the leading right corner 30LR. A trailing edge of the original 30 is defined as an edge extending between the trailing left corner 30TL and the trailing right corner 30TR. The leading edge and the trailing edge of the original 30 extend in the orthogonal-to-conveyance direction A if the original 30 is positioned correctly with respect to the conveying direction D. The width 30W of the original 30 can therefore be determined as the length of the leading edge and the trailing edge.

Side edges of the original 30 are defined as edges extending between the leading left corner 30LL and the trailing left corner 30TL and extending between the leading right corner 30LR and the trailing right corner 30TR. The side edges extend orthogonal to the leading edge and the trailing edge. Therefore, the side edges extend parallel to the conveying direction D if the original 30 is positioned correctly with respect to the conveying direction D. The length 30L of the original 30 can therefore be determined as the length of the side edges of the original 30.

An inclination "a" of the original 30 relative to the orthogonal-to-conveyance direction A is also defined as an angle by which the leading edge and the trailing edge of the original 30 are actually shifted from the orthogonal-to-conveyance direction A. The inclination "a" is defined as an angle between the leading edge or the trailing edge and the orthogonal-to-conveyance direction A.

If the CIS unit 25 reads the original 30 while the original 30 is skewed such that the leading left corner 30LL projects in the conveying direction D as shown in FIG. 6, a dot on the original 30 positioned farthest rightward (hereinafter the "rightmost point") corresponds to the leading right corner 30LR. A dot on the original 30 positioned farthest leftward (hereinafter the "leftmost point") corresponds to the trailing left corner 30TL. Conversely, if the CIS unit 25 reads the original 30 while the original 30 is skewed such that the leading right corner 30LR projects in the conveying direction D, the trailing right corner 30TR corresponds to the rightmost point, and the leading left corner 30LL corresponds to the leftmost point.

Turning back to FIG. 8, the process proceeds from S201 to S202 when the CPU 101 obtains data of the leading left corner 30LL and the leading right corner 30LR from scan data that the CIS unit 25 generates while the CIS unit 25 reads the leading portion of the original 30. In S202, the CPU 101 detects the width 30W of the original 30. More specifically, the CPU 101 determines a distance between the leading left corner 30LL and the leading right corner 30LR based on the coordinates of the leading left corner 30LL and the leading right corner 30LR, and sets the determined distance as the width 30W.

In S203 the CPU 101 detects the length 30L of the original 30 based on the width 30W by referencing the correspondence table 104A. For example, if the CPU 101 determines the width 30W as being equal to 105 mm in S202, the CPU 101 determines the length 30L as being equal to 148 mm in S203.

In S204 the CPU 101 detects an inclination "a" of the original 30 relative to the orthogonal-to-conveyance direction A based on the scan data. The CPU 101 determines the inclination "a" based on the coordinates of the leading left corner 30LL and leading right corner 30LR.

In S205 the CPU 101 determines the leftmost point and the rightmost point of the original 30. In order to determine the leftmost point and the rightmost point of the original 30, the CPU 101 first calculates the coordinates of the trailing right corner 30TR and trailing left corner 30TL based on: the coordinates of the leading left corner 30LL and leading right corner 30LR; the length 30L; and the inclination "a," which are detected in S202-S204. The CPU 101 determines the leftmost point and the rightmost point by determining whether the trailing right corner 30TR corresponds to the rightmost point or whether the trailing left corner 30TL corresponds to the leftmost point.

In S206 the CPU 101 executes a correct-position-determining process to determine whether the original 30 is positioned correctly in the conveying path 27 and subsequently ends the position-determining process.

Figure 9:
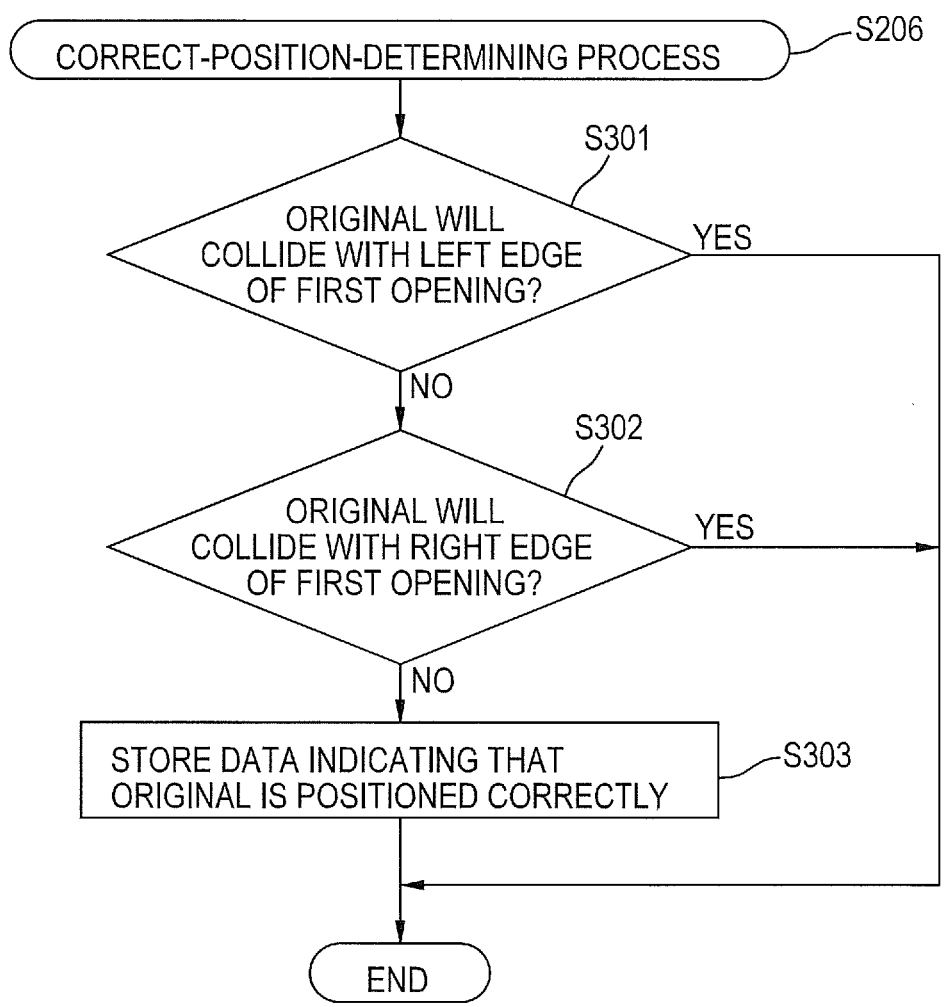
FIG. 9 is a flowchart illustrating steps in a correct-position-determining process in the position-determining process of FIG. 8.

Next, the correct-position-determining process of S206 will be described with reference to FIG. 9.

First, in S301 the CPU 101 determines whether the original 30 will collide with the left edge 224 defining the first original-discharge opening 223 if the original 30 is conveyed to the first original-discharge opening 223. Here, the CPU 101 determines that the original 30 will collide with the left edge 224 if the coordinates of the leftmost point determined in S205 are further leftward in relation to the conveying direction D than the coordinates of the left edge 224.

If the CPU 101 determines that the original 30 will not collide with the left edge 224 (S301: NO), in S302 the CPU 101 determines whether the original 30 will collide with the right edge 225. As with the determination in S301, the CPU 101 determines that the original 30 will collide with the right edge 225 if the coordinates of the rightmost point are further rightward in relation to the conveying direction D than the coordinates of the right edge 225.

If the CPU 101 determines that the original 30 will not collide with the right edge 225 (S302: NO), in S303 the CPU 101 stores data in the RAM 103 indicating that the original 30 is correctly positioned in the conveying path 27, and subsequently ends the correct-position-determining process.

However, if the CPU 101 determines that the original 30 will collide with the left edge 224 (S301: YES) or that the original 30 will collide with the right edge 225 (S302: YES), then the CPU 101 immediately ends the correct-position-determining process, without storing in the RAM 103 data indicating that the original 30 is correctly positioned in the conveying path 27. Note that in both cases of (S301: YES) and (S302: YES), the CPU 101 may be configured to store data in the RAM 103 indicating that the original 30 is abnormally positioned in the conveying path 27.

According to the first embodiment described above, when the CPU 101 determines that the original 30 is not in its correct position (S103: NO), the CPU 101 stops conveying the original 30 (S106) or conveys the original 30 to the original discharge tray 222 (S107). Therefore, the CPU 101 can prevent paper jams by not conveying the original 30 to the first original-discharge opening 223 when there is a high probability that the original 30 cannot be conveyed through the same.

Further, after determining that the width 30W of the original 30 is smaller than the A6-size short dimension (no in S101), the CPU 101 determines whether the original 30 will collide with the left edge 224 of the first original-discharge opening 223 (S301). Accordingly, the CPU 101 can prevent paper jams by not conveying the original 30 to the first original-discharge opening 223 when there is a high probably that the original 30 will collide with the left edge 224 of the first original-discharge opening 223.

Similarly, the CPU 101 judges whether the original 30 will collide with the right edge 225 of the first original-discharge opening 223 (S302). Accordingly, the CPU 101 can prevent paper jams by not conveying the original 30 to the first original-discharge opening 223 when there is a high probably that the original 30 will collide with the right edge 225 of the first original-discharge opening 223.

Further, when the CPU 101 determines that the original 30 loaded in the original tray 221 is of A6-size or larger (S101: YES), in S107 the CPU 101 conveys the original 30 to the original discharge tray 222 after the CIS unit 25 has read an image from the original 30 one line at a time. When it is clear that the original 30 cannot be conveyed to the first original-discharge opening 223 prior to conveying the original 30, the CPU 101 makes a determination equivalent to at least one of the determination that the original 30 will collide with the left edge 224 of the first original-discharge opening 223 (S301: YES) and the determination that the original 30 will collide with the right edge 225 of the first original-discharge opening 223 (S302: YES), and conveys the original 30 to the original discharge tray 222. Hence, this configuration reduces load on the CPU 101 by eliminating the need to execute the position-determining process of S102. Further, by conveying the original 30 to the original discharge tray 222, the CPU 101 can avoid a reduction in throughput.

If the CPU 101 determines that the original 30 loaded in the original tray 221 is smaller than A6-size (S101: NO) and determines that the original 30 can be conveyed to the original discharge tray 222 (S105: YES), then the CPU 101 conveys the original 30 to the original discharge tray 222 (S107). Accordingly, the CPU 101 is configured to convey sheets of the original 30 that are smaller than A6-size but larger than business card size to the original discharge tray 222, thereby avoiding a reduction in throughput.

Further, when the CPU 101 determines that the original 30 loaded in the original tray 221 is smaller than A6-size (S101: NO) and determines that the original 30 cannot be conveyed to the original tray 221 (S105: NO), then the CPU 101 halts conveyance of the original 30 (S106). Accordingly, the CPU 101 can stop conveying the original 30 when determining that the original 30 can be conveyed to neither the first original-discharge opening 223 nor the original discharge tray 222, thereby avoiding damage to the original 30, such as bends or tears, caused by such conveyance.

After determining the leading left corner 30LL and leading right corner 30LR from the scan data, the CPU 101 detects the width 30W of the original 30 (S202). In this way, the CPU 101 can detect the width 30W from the scan data and, hence, can accurately detect the width 30W of the original 30.

In the above description, in S105, the CPU 101 determines the width 30W of the original 30 based on scan data that has been obtained during the position-determining process of S102. However, the CPU 101 may determine the width 30W of the original 30 based on detection results of the original sensor 24.

<First Modification of the Correct-Position-Determining Process of S206>

In the correct-position-determining process of S206 described above, the MFP 1 determines whether the original 30 will collide with at least one of the left edge 224 and right edge 225 defining the first original-discharge opening 223 based on the coordinates of the original 30.

However, according to a first modification of the correct-position-determining process of S206, the MFP 1 determines whether the original 30 can pass through the first original-discharge opening 223 based on an effective width of the original 30 being conveyed, rather than on the coordinates of the original 30. As shown in FIG. 6, the effective width of the original 30 (which will be referred to as "effective width 30EW" hereinafter) indicates how far the leftmost point and the rightmost point of the original 30 are separate from each other in the orthogonal-to-conveyance direction A.

The correct-position-determining process according to the first modification will be described with reference to FIG. 6 and FIG. 10. Description of configurations identical to those in the first embodiment described above is omitted from the following description of the first modification.

First, in S401 of FIG. 10, the CPU 101 detects the effective width 30EW of the original 30 based on the leftmost point and the rightmost point determined in S205. That is, the CPU 101 determines the effective width 30EW of the original 30 as a difference between the coordinates of the leftmost point and the rightmost point in the orthogonal-to-conveyance direction A.

In S402 the CPU 101 determines whether the original 30 can pass through the first original-discharge opening 223. The CPU 101 determines that the original 30 can pass through the first original-discharge opening 223 when the effective width 30EW of the original 30 is smaller than the width of the first original-discharge opening 223. It is noted that the width of the first original-discharge opening 223 has been pre-stored in the NVRAM 104 as a prescribed value.

If the CPU 101 determines that the original 30 can pass through the first original-discharge opening 223 (S402: YES), in S303 the original 30 stores data in the RAM 103 indicating that the original 30 is positioned correctly, and subsequently ends the correct-position-determining process.

However, if the CPU 101 determines that the original 30 cannot pass through the first original-discharge opening 223 (S402: NO), then the CPU 101 does not store data in the RAM 103 indicating that the original 30 is positioned correctly since there is a low probability that the original 30 will be able to pass through the first original-discharge opening 223. Subsequently, the CPU 101 ends the correct-position-determining process.

In the first variation of the correct-position-determining process described above, the CPU 101 ends the correct-position-determining process without storing data in the RAM 103 indicating that the original 30 is positioned correctly when determining that the original 30 cannot pass through the first original-discharge opening 223 (S402: NO) since it is unlikely that the original 30 will be able to pass through the first original-discharge opening 223. Accordingly, when it is likely that the original 30 will collide with the left edge 224 or right edge 225 defining the first original-discharge opening 223, the CPU 101 does not convey the original 30 to the first original-discharge opening 223, thereby preventing a paper jam.

<Second Modification of the Correct-Position-Determining Process of S206>

A second modification of the correct-position-determining process of S206 will be described with reference to FIG. 11. If the original 30 is skewed at a prescribed inclination or greater, the effective width 30EW of the original 30 increases as a result of this skew. In this modification, therefore, the CPU 101 determines whether the original 30 can pass through the first original-discharge opening 223 based on the skew in the original 30 rather than the effective width 30EW.

The correct-position-determining process according to the second modification will be described with reference to FIG. 11. Description of configurations identical to those described above is omitted from the following description of the second modification.

In S501 of FIG. 11, the CPU 101 determines whether the inclination "a" of the original 30 detected in S204 is smaller than or equal to a prescribed inclination amount. The prescribed inclination amount is pre-stored in the NVRAM 104. If the CPU 101 determines that the inclination "a" of the original 30 is smaller than or equal to the prescribed inclination amount (S501: YES), in S303 the CPU 101 stores data in the RAM 103 indicating that the original 30 is positioned correctly, and subsequently ends the correct-position-determining process.

However, if the CPU 101 determines that the inclination "a" of the original 30 is greater than the prescribed inclination amount (S501: NO), then the CPU 101 ends the correct-position-determining process without storing data in the RAM 103 indicating that the original 30 is correctly positioned, since there is a low probability that the original 30 can pass through the first original-discharge opening 223.

According to the second modification of the correct-position-determining process described above, the CPU 101 ends the correct-position-determining process upon determining in S501 that the inclination "a" of the original 30 is greater than the prescribed inclination amount (S501: NO), without storing data in the RAM 103 indicating that the original 30 is positioned correctly, since it is unlikely that the original 30 will be able to pass through the first original-discharge opening 223. Accordingly, when the original 30 is skewed at a large inclination "a", making it likely that the original 30 will collide with the left edge 224 or right edge 225 defining the first original-discharge opening 223, the CPU 101 does not convey the original 30 to the first original-discharge opening 223, thereby preventing a paper jam.

Second Embodiment

In the first embodiment, the invention is applied to the image-reading unit 20. However, the invention may also be applied to the image-forming unit 10.

In such a case, the conveying path 12 formed in the image-forming unit 10 corresponds to the first conveying path 27A formed in the image-reading unit 20, while the conveying path 11 formed in the image-forming unit 10 corresponds to the second conveying path 27B of the image-reading unit 20. Further, the recording-paper tray 91 and the manual-paper-feed tray 112 correspond to the original tray 221 of the first embodiment, while the recording-paper discharge tray 92 corresponds to the original discharge tray 222. In addition, the first recording-sheet-discharge opening 116 formed in the rear side of the MFP 1 (the left side in FIG. 2) corresponds to the first original-discharge opening 223. The second recording-sheet-discharge opening 110 corresponds to the second original-discharge opening 226.

Similarly to the first embodiment, sheets of recording paper are placed on the recording-paper tray 91 with their short edges being oriented orthogonal to the conveying direction of the conveying path 11. A recording paper is placed on the manual-paper-feed tray 112 with its short edges being oriented orthogonal to the conveying direction of the conveying path 12. A width of each recording paper is defined as a size of the recording paper in a direction orthogonal to the conveying direction if the recording paper is correctly positioned with respect to the conveying direction. So, in this example, the width of the recording paper is equivalent to the short dimension of the recording paper. It is further noted that a length of the recording paper is defined as a size of the recording paper in the conveying direction if the recording paper is correctly positioned with respect to the conveying direction. So, in this example, the length of the recording paper is equivalent to the long dimension of the recording paper.

The CPU 101 acquires data on the recording paper size for the print job, thereby detecting the recording paper size (width, for example) before the sheet of recording paper is started being conveyed.

In S101 the CPU 101 determines whether the recording paper used for the present print job has a size greater than or equal to the A6-size based on paper size data provided in the print job. For example, the CPU 101 determines whether the width of the paper used for the present print job is greater than or equal to the A6-size short dimension. Or, the CPU 101 may determine whether the length of the paper used for the present print job is greater than or equal to the A6-size long dimension.

In S105 the CPU 101 judges whether the paper is larger than the business card size based on paper size data included in the print job, thereby determining whether the paper can be conveyed to the recording-paper discharge tray 92.

For example, the CPU 101 determines the width of the recording paper based on paper size data included in the print job, and judges whether the width of the recording paper is larger than the business card short dimension. When the width of the recording paper is larger than the business card short dimension, the CPU 101 determines that the paper can be conveyed to the recording-paper discharge tray 92.

Or, the CPU 101 may determine the length of the recording paper based on paper size data included in the print job, and judge whether the length of the recording paper is greater than the business card long dimension. When the length of the recording paper is larger than the business card long dimension, the CPU 101 determines that the recording paper can be conveyed to the recording-paper discharge tray 92.

If the recording paper is smaller than or equal to a business card size (no in S105), the CPU 101 stops conveying the paper in S106. This is because the interval between the fixing unit 8 and the discharge rollers 76 is greater than the business card long dimension (91 mm). So, if the recording paper is smaller than or equal to the business card size, the length of the recording paper is shorter than the interval between the fixing unit 8 and the discharge rollers 76. Such a recording paper is unable to be held by the fixing unit 8 and the discharge rollers 76 simultaneously, and therefore cannot be properly conveyed by the fixing unit 8 and the discharge rollers 76. This is also because a business card is too small to be firmly attached to the conveying belt 7 and therefore cannot be stably conveyed by the conveying belt 7.

In order to execute the position-determining process of S102 for the image-forming unit 10, the conveying path 11 and conveying path 12 may be provided with a skew-determining mechanism for determining skew in a sheet of paper. For example, the skew-determining mechanism includes a plurality of sensors aligned in a direction orthogonal to the paper-conveying direction and determines skew in the paper based on the timing at which each sensor detects the sheet.

In S202 and S203 of the position determining process, the CPU 101 respectively detects the width and length of the paper based on paper size data included in the print job. In S204 the CPU 101 detects skew in the paper using the skew-determining mechanism. In S205 the CPU 101 sets the leftmost point to the position of the leftmost sensor in the skew-determining mechanism that has detected the paper and sets the rightmost point to the position of the rightmost sensor in the skew-determining mechanism that has detected the paper.

While the invention has been described in detail with reference to the embodiments thereof, it would be apparent to those skilled in the art that various changes and modifications may be made therein without departing from the spirit of the invention.

For example, in order to detect the width 30W of the original 30 while the original 30 is being conveyed in the image-reading unit 20, an original width sensor may be disposed between the original tray 221 and the CIS unit 25 for detecting at least one of the leading and trailing edges of the original 30.

Similarly, in order to detect the width of the recording sheet while the recording sheet is being conveyed in the image-forming unit 10, a recording-sheet width sensor 118 may be disposed immediately before the conveying rollers 72 as shown in FIG. 2. The recording-sheet width sensor 118 is for detecting at least one of the leading and trailing edges of the recording sheet.

In the conveyance control process of the first embodiment, the determination in S101 is executed by judging whether the width 30W of the original 30 is greater than or equal to the A6-size short dimension. However, the present invention is not limited to this method. For example, the CPU 101 may judge whether the length 30L of the original 30 is greater than or equal to an A6-size long dimension. More specifically, the CPU 101 may first determine the width 30W of the original based on the detection results of the original sensor 24, acquire a long dimension that is stored in the correspondence table 104A in correspondence with a short dimension that is equal to the width 30W of the original 30, set the acquired long dimension as the length 30L of the original 30, and determine whether the determined length 30L of the original 30 is greater than or equal to the A6-size long dimension.

In the position-determining process of the first embodiment, the CPU 101 makes the determination in S203 by referencing the correspondence table 104A and finds the length 30L of the original 30 based on the width 30W. However, the present invention is not limited to this method. For example, the CPU 101 may detect the coordinates of the trailing right corner 30TR and trailing left corner 30TL based on the scan data and may calculate the length 30L based on the coordinates of the leading left corner 30LL and trailing left corner 30TL or the coordinates of the leading right corner 30LR and trailing right corner 30TR.

In the position-determining process of S102 in the first embodiment, the CPU 101 determines the leftmost point and rightmost point in S205 by calculating the coordinates of the trailing right corner 30TR and trailing left corner 30TL based on the coordinates of the leading left corner 30LL and leading right corner 30LR, the length 30L, and the inclination "a". However, the present invention is not limited to this method. For example, the CPU 101 may acquire the coordinates of the leading left corner 30LL, leading right corner 30LR, trailing right corner 30TR, and trailing left corner 30TL based on an edge image depicting the overall original 30, and may determine the leftmost and rightmost points based on the acquired coordinates.

In the first embodiment described above, an image of the original 30 is read with the CIS unit 25. However, a charge-coupled device (CCD) may be used to read images instead.

A portion of the conveyance control process may be omitted. For example, both of the judging processes of S101 and S105 may be omitted. In this case, after beginning the conveyance control process, the CPU 101 executes S102 and S103, without executing S101, and advances to S104 when the determination in S103 is YES. If the determination in S103 is NO, the CPU 101 executes the process of S106 or S107, without executing S105. Alternatively, only one of steps S101 and S105 may be omitted from the conveyance control process.

In the first embodiment, the CPU 101 controls the switching part 37 to switch the conveying path between the first conveying path 27A and second conveying path 27B. However, the conveying path may be switched by manually opening and closing the first cover 31. For example, the image-reading unit 20 may be provided with an interlocking mechanism for interlocking the first cover 31 with the switching unit 37. The interlocking mechanism switches the switching unit 37 into a position for opening the first conveying path 27A when the first cover 31 is opened, and switches the switching unit 37 into a position for blocking the first conveying path 27A when the first cover 31 is closed. The image-reading unit 20 may be further provided with a cover sensor for detecting when the first cover 31 is in at least one of the open state and the closed state. For example, if the CPU 101 determines that the original 30 should be conveyed to the original discharge tray 222 in S105 of the conveyance control process (S105: YES), then the CPU 101 displays a message on the display unit 15 prompting the user to close the first cover 31. When the cover sensor detects that the first cover 31 is in a closed state, the CPU 101 knows that the conveying path 27 is changed from the first conveying path 27A to the second conveying path 27B, and advances to S107.

In the above description, the image-forming unit 10 is of the electrophotographic type. However, the image-forming unit 10 may be modified into an inkjet type.

In the above description, the invention is applied to the multifunction peripheral 1. However, the invention may be applied to an image-forming device that has no image-reading function and to an image-reading device that has no image-forming function. The invention may be applied to other various types of sheet conveying device that conveys sheets to an opening formed through a wall of the device.

In the first embodiment, in S105, the CPU 101 judges whether the width 30W of the original 30 is larger than the business card short dimension or whether the length 30L of the original 30 is larger than the business card long dimension. However, in S105, the CPU 101 may judge whether the length 30L of the original 30 is longer than or equal to the interval L2 between the conveying rollers 265 and 266. If the length 30L of the original 30 is longer than or equal to the interval L2 (yes in S105), the CPU 101 determines that the original 30 can be conveyed to the original discharge tray 222 and therefore the process proceeds to S107. On the other hand, if the length 30L of the original 30 is shorter than the interval L2 (no in S105), the CPU 101 determines that the original 30 cannot be conveyed to the original discharge tray 222 and therefore the process proceeds to S106. Similarly, in the second embodiment, the CPU 101 may judge in S105 whether the length of the recording paper is longer than or equal to the interval between the fixing unit 8 and the discharge rollers 76. If the length of the recording paper is larger than or equal to the interval (yes in S105), the CPU 101 determines that the recording paper can be conveyed to the recording-paper discharge tray 92 and therefore the process proceeds to S107. On the other hand, if the length of the recording paper is smaller than the interval (no in S105), the CPU 101 determines that the recording paper cannot be conveyed to the recording-paper discharge tray 92, and stops conveying the paper in S106.

In the first embodiment, the original 30 is placed on the original tray 221 with its short edges being oriented orthogonal to the conveying direction of the conveying path 27. Similarly, in the second embodiment, sheets of recording paper are placed on the recording-paper tray 91 with their short edges being oriented orthogonal to the conveying direction of the conveying path 11. A recording paper is placed on the manual-paper-feed tray 112 with its short edges being oriented orthogonal to the conveying direction of the conveying path 12. However, the original 30 may be placed on the original tray 221 with its long edges being oriented orthogonal to the conveying direction of the conveying path 27. In this case, the width 30W of the original 30 is equivalent to the long dimension of the original 30, and the length 30L of the original 30 is equivalent to the short dimension of the original 30. Similarly, in the second embodiment, sheets of recording paper may be placed on the recording-paper tray 91 with their long edges being oriented orthogonal to the conveying direction of the conveying path 11. A recording paper may be placed on the manual-paper-feed tray 112 with its long edges being oriented orthogonal to the conveying direction of the conveying path 12. In this case, the width of the recording paper is equivalent to the long dimension of the recording paper, and the length of the recording paper is equivalent to the short dimension of the recording paper.

What is claimed is:

1. A sheet conveying apparatus, comprising:
    a sheet placing part that is configured to receive a sheet placed thereon;
    a conveying part that is configured to convey the sheet from the sheet placing part;
    an apparatus wall defining a first conveyance opening; and
    a judging unit that is configured to judge whether the sheet is able to pass the first conveyance opening,
    the conveying part conveying the sheet to the first conveyance opening if the judging unit determines that the sheet is able to pass through the first conveyance opening, and the conveying part not conveying the sheet to the first conveyance opening if the judging unit determines that the sheet is unable to pass through the first conveyance opening,
    wherein a conveyance direction is defined as a direction in which the conveying part conveys the sheet, a width direction being defined as a direction orthogonal to the conveyance direction,
    wherein a width of the sheet is defined as a size of the sheet in the width direction if the sheet is positioned correctly with respect to the conveying direction,
    wherein the sheet conveying apparatus further comprises:
        a first width detecting unit that is configured to detect the width of the sheet before the conveying part starts conveying the sheet; and
        a width judging unit that is configured to judge, based on a detection result by the first width detecting unit, whether the width of the sheet is greater than or equal to a prescribed first width,
    wherein the judging unit determines that the sheet is unable to pass through the first conveyance opening if the width judging unit determines that the width of the sheet is greater than or equal to the prescribed first width,
    wherein the apparatus wall defines a second conveyance opening whose width defined in a widthwise direction is greater than that of the first conveyance opening, and
    wherein the conveying part conveys the sheet to the second conveyance opening if the judging unit determines that the sheet is unable to pass through the first conveyance opening.

2. The sheet conveying apparatus as claimed in claim 1, wherein the apparatus wall defines a left edge of the first conveyance opening, and wherein the judging unit judges whether a left edge of the sheet is further leftward than the left edge of the first conveyance opening with respect to a conveyance direction, in which the conveying part conveys the sheet.

3. The sheet conveying apparatus as claimed in claim 1, wherein the apparatus wall defines a right edge of the first conveyance opening, and wherein the judging unit judges whether a right edge of the sheet is further rightward than the right edge of the first conveyance opening with respect to a conveyance direction, in which the conveying part conveys the sheet.

4. The sheet conveying apparatus as claimed in claim 1,
    wherein the first conveyance opening is formed through the apparatus wall so as to extend to a first side edge in a first side direction and to a second side edge in a second side direction, the first side direction and the second side direction being opposite to each other and extending orthogonal to a conveyance direction, in which the conveying part conveys the sheet, and
    wherein the judging unit determines that the sheet is unable to pass through the first conveyance opening if the sheet is located relative to the first conveyance opening such that the sheet extends in the first side direction beyond the first side edge of the first conveyance opening or the sheet extends in the second side direction beyond the second side edge of the first conveyance opening.

5. A sheet conveying apparatus, comprising:
    a sheet placing part that is configured to receive a sheet placed thereon;
    a conveying part that is configured to convey the sheet from the sheet placing part;
    an apparatus wall defining a first conveyance opening; and
    a judging unit that is configured to judge whether the sheet is able to pass the first conveyance opening,
    the conveying part conveying the sheet to the first conveyance opening if the judging unit determines that the sheet is able to pass through the first conveyance opening, and the conveying part not conveying the sheet to the first conveyance opening if the judging unit determines that the sheet is unable to pass through the first conveyance opening,
    wherein a conveyance direction is defined as a direction in which the conveying part conveys the sheet, a width direction being defined as a direction orthogonal to the conveyance direction,
    wherein a width of the sheet is defined as a size of the sheet in the width direction if the sheet is positioned correctly with respect to the conveying direction, wherein the apparatus wall defines a second conveyance opening whose width defined in the width direction is greater than that of the first conveyance opening, wherein the judging unit judges whether the conveying part is able to convey the sheet to the second conveyance opening if the judging unit determines that the sheet is unable to pass through the first conveyance opening, and wherein the conveying part conveys the sheet to the second conveyance opening if the judging unit determines that the conveying part is able to convey the sheet to the second conveyance opening.

6. The sheet conveying apparatus as claimed in claim 5, wherein a conveyance direction is defined as a direction in which the conveying part conveys the sheet, a width direction being defined as a direction orthogonal to the conveyance direction, wherein a width of the sheet is defined as a size of the sheet in the width direction if the sheet is positioned correctly with respect to the conveying direction, wherein the sheet conveying apparatus further comprises:
  a first width detecting unit that is configured to detect the width of the sheet before the conveying part starts conveying the sheet; and
  a width judging unit that is configured to judge, based on a detection result by the first width detecting unit, whether the width of the sheet is greater than or equal to a prescribed first width, and wherein the judging unit determines that the sheet is unable to pass through the first conveyance opening if the width judging unit determines that the width of the sheet is greater than or equal to the prescribed first width.

7. The sheet conveying apparatus as claimed in claim 5, wherein the apparatus wall defines a left edge of the first conveyance opening, and wherein the judging unit judges whether a left edge of the sheet is further leftward than the left edge of the first conveyance opening with respect to a conveyance direction, in which the conveying part conveys the sheet.

8. The sheet conveying apparatus as claimed in claim 5, wherein the apparatus wall defines a right edge of the first conveyance opening, and wherein the judging unit judges whether a right edge of the sheet is further rightward than the right edge of the first conveyance opening with respect to a conveyance direction, in which the conveying part conveys the sheet.

9. The sheet conveying apparatus as claimed in claim 5, wherein the first conveyance opening is formed through the apparatus wall so as to extend to a first side edge in a first side direction and to a second side edge in a second side direction, the first side direction and the second side direction being opposite to each other and extending orthogonal to a conveyance direction, in which the conveying part conveys the sheet, and wherein the judging unit determines that the sheet is unable to pass through the first conveyance opening if the sheet is located relative to the first conveyance opening such that the sheet extends in the first side direction beyond the first side edge of the first conveyance opening or the sheet extends in the second side direction beyond the second side edge of the first conveyance opening.

10. A sheet conveying apparatus, comprising:
a sheet placing part that is configured to receive a sheet placed thereon;
a conveying part that is configured to convey the sheet from the sheet placing part;
an apparatus wall defining a first conveyance opening; and
a judging unit that is configured to judge whether the sheet is able to pass the first conveyance opening, the conveying part conveying the sheet to the first conveyance opening if the judging unit determines that the sheet is able to pass through the first conveyance opening, and the conveying part not conveying the sheet to the first conveyance opening if the judging unit determines that the sheet is unable to pass through the first conveyance opening, wherein a conveyance direction is defined as a direction in which the conveying part conveys the sheet, a width direction being defined as a direction orthogonal to the conveyance direction, wherein a width of the sheet is defined as a size of the sheet in the width direction if the sheet is positioned correctly with respect to the conveying direction, wherein the sheet conveying apparatus further comprises:
  a first width detecting unit that is configured to detect the width of the sheet before the conveying part starts conveying the sheet; and
  a width judging unit that is configured to judge, based on a detection result by the first width detecting unit, whether the width of the sheet is greater than or equal to a prescribed first width, wherein the judging unit determines that the sheet is unable to pass through the first conveyance opening if the width judging unit determines that the width of the sheet is greater than or equal to the prescribed first width, wherein the apparatus wall defines a second conveyance opening whose width defined in the width direction is greater than that of the first conveyance opening, wherein the sheet conveying apparatus further comprises a second width detecting unit that is configured to detect the width of the sheet while the conveying part conveys the sheet, wherein the width judging unit is configured to further judge whether the width of the sheet is greater than a prescribed second width if the width judging unit determines that the width of the sheet is smaller than the prescribed first width, the prescribed second width being smaller than the prescribed first width, the width judging unit judging whether the width of the sheet is greater than the prescribed second width based on either one of a detection result by the first width detecting unit and a detection result by the second width detecting unit; and wherein the judging unit determines that the conveying part is able to convey the sheet to the second conveyance opening if the width judging unit determines that the width of the sheet is greater than the prescribed second width.

11. The sheet conveying apparatus as claimed in claim 10, further comprising a scanning unit that is configured to scan the sheet and produce image data while the conveying part conveys the sheet,
  wherein the second width detecting unit detects the width of the sheet based on the image data.

12. A sheet conveying apparatus, comprising:
a sheet placing part that is configured to receive a sheet placed thereon;
a conveying part that is configured to convey the sheet from the sheet placing part;
an apparatus wall defining a first conveyance opening; and
a judging unit that is configured to judge whether the sheet is able to pass the first conveyance opening, the conveying part conveying the sheet to the first conveyance opening if the judging unit determines that the sheet is able to pass through the first conveyance opening, and the conveying part not conveying the sheet to the first conveyance opening if the judging unit determines that the sheet is unable to pass through the first conveyance opening, wherein a conveyance direction is defined as a direction in which the conveying part conveys the sheet, a width direction being defined as a direction orthogonal to the conveyance direction, wherein a width of the sheet is defined as a size of the sheet in the width direction if the sheet is positioned correctly with respect to the conveyance direction, wherein the sheet conveying apparatus further comprises:
- a first width detecting unit that is configured to detect the width of the sheet before the conveying part starts conveying the sheet; and
- a width judging unit that is configured to judge, based on a detection result by the first width detecting unit, whether the width of the sheet is greater than or equal to a prescribed first width, wherein the judging unit determines that the sheet is unable to pass through the first conveyance opening if the width judging in unit determines that the width of the sheet is greater than or equal to the prescribed first width, wherein the apparatus wall defines a second conveyance opening whose width defined in the width direction is greater than that of the first conveyance opening, wherein a length of the sheet is defined as a size of the sheet in the conveyance direction if the sheet is positioned correctly with respect to the conveying direction, wherein the conveying part includes:
- a first conveying path, along which conveying rollers are arranged by a first interval in the conveyance direction so as to convey the sheet toward the first opening; and
- a second conveying path, along which conveying rollers are arranged by a second interval in the conveyance direction so as to convey the sheet toward the second opening, the second interval being greater than the first interval, wherein the sheet conveying apparatus further comprises a length detecting unit that is configured to detect the length of the sheet, wherein the judging unit includes a length judging unit that is configured to judge whether the length of the sheet is shorter than the second interval, and wherein the conveying part stops conveying the sheet if the length judging unit determines that the length of the sheet is shorter than the second interval.

\* \* \* \* \*